(12) United States Patent
Skinner et al.

(10) Patent No.: US 8,193,742 B2
(45) Date of Patent: Jun. 5, 2012

(54) PROGRAMMABLE MOTOR FOR WINDOW COVERINGS

(75) Inventors: Gary Skinner, Lafayette, CO (US); Richard Langille, Lafayette, CO (US); Philip Chermak, Lafayette, CO (US)

(73) Assignee: Hunter Douglas Inc., Pearl River, NY (US)

( * ) Notice: Subject to any disclaimer, the term of this patent is extended or adjusted under 35 U.S.C. 154(b) by 747 days.

(21) Appl. No.: 12/177,330

(22) Filed: Jul. 22, 2008

(65) Prior Publication Data

US 2010/0018654 A1    Jan. 28, 2010

(51) Int. Cl.
*H02P 1/54* (2006.01)
*H02P 5/00* (2006.01)
*H02P 5/46* (2006.01)

(52) U.S. Cl. ............ 318/34; 318/16; 318/280; 318/282; 160/84.01; 160/130; 160/133; 160/168.1

(58) Field of Classification Search ............... 318/16, 318/34, 280, 282; 160/84.01, 130, 133, 168.1
See application file for complete search history.

(56) References Cited

U.S. PATENT DOCUMENTS

| | | |
|---|---|---|
| 1,733,176 A | 10/1929 | Winter |
| 2,124,037 A | 7/1938 | Lavigne |
| 3,030,535 A | 4/1962 | Weisner |
| 3,308,873 A | 3/1967 | Dotto |
| 3,310,099 A | 3/1967 | Hunter et al. |
| 3,340,835 A | 9/1967 | Cook et al. |
| 3,459,978 A | 8/1969 | Trucks et al. |
| 3,809,143 A * | 5/1974 | Ipekgil ................... 160/168.1 P |
| 4,159,162 A | 6/1979 | Christoffel |
| 4,471,248 A | 9/1984 | Smetana |
| 4,623,812 A | 11/1986 | van de Griend |
| 4,827,199 A | 5/1989 | Kaucic et al. |
| 4,878,528 A | 11/1989 | Kobayashi |
| 4,885,948 A | 12/1989 | Thrasher, Jr. et al. |
| 5,010,940 A | 4/1991 | Marocco |
| 5,274,499 A | 12/1993 | Shopp |
| 5,467,266 A | 11/1995 | Jacobs et al. |
| 5,515,898 A | 5/1996 | Alcocer |
| 5,671,387 A | 9/1997 | Jacobs et al. |
| 5,760,558 A * | 6/1998 | Popat ........................ 318/480 |

(Continued)

FOREIGN PATENT DOCUMENTS

WO    WO 01/77479 A2    10/2001

(Continued)

OTHER PUBLICATIONS

International Search Report and Written Opinion of the International Searching Authority in corresponding International application No. PCT/US2009/051405, dated Sep. 15, 2009, 8 pages.

*Primary Examiner* — Walter Benson
*Assistant Examiner* — Erick Glass
(74) *Attorney, Agent, or Firm* — Dorsey & Whitney LLP

(57) ABSTRACT

An architectural window covering having a programmable electric motor is disclosed. The architectural window covering includes a head rail comprising at least one cavity, a shade coupled to the head rail, a bottom rail coupled to the shade, and at least two tandem stacked motors coupled to the shade via a drive rail such that the at least two motors fit within the at least one cavity of the head rail.

25 Claims, 7 Drawing Sheets

U.S. PATENT DOCUMENTS

| | | | |
|---|---|---|---|
| 5,793,174 A | 8/1998 | Kovach et al. | |
| 6,328,274 B1 | 12/2001 | Hayashi | |
| 6,487,267 B1 | 11/2002 | Wolter | |
| 6,630,758 B2 | 10/2003 | Aoki et al. | |
| 6,979,962 B2 | 12/2005 | Cavarec et al. | |
| 7,407,040 B2 | 8/2008 | Doran | |
| 7,723,939 B2 * | 5/2010 | Carmen, Jr. | 318/466 |
| 2001/0050538 A1 | 12/2001 | Kovach et al. | |
| 2002/0190678 A1 | 12/2002 | Huber et al. | |
| 2007/0191126 A1 | 8/2007 | Mandracken | |
| 2008/0044790 A1 | 2/2008 | Fani et al. | |
| 2009/0059574 A1 * | 3/2009 | Lewis et al. | 362/183 |
| 2010/0175838 A1 | 7/2010 | Faller et al. | |

FOREIGN PATENT DOCUMENTS

| | | |
|---|---|---|
| WO | 2005/085578 A2 | 9/2005 |
| WO | 2005/090736 A1 | 9/2005 |
| WO | 2006/046103 A1 | 5/2006 |

* cited by examiner

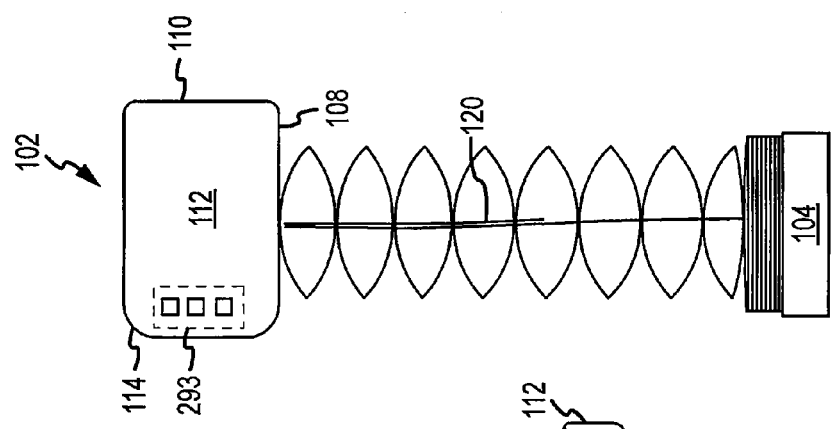
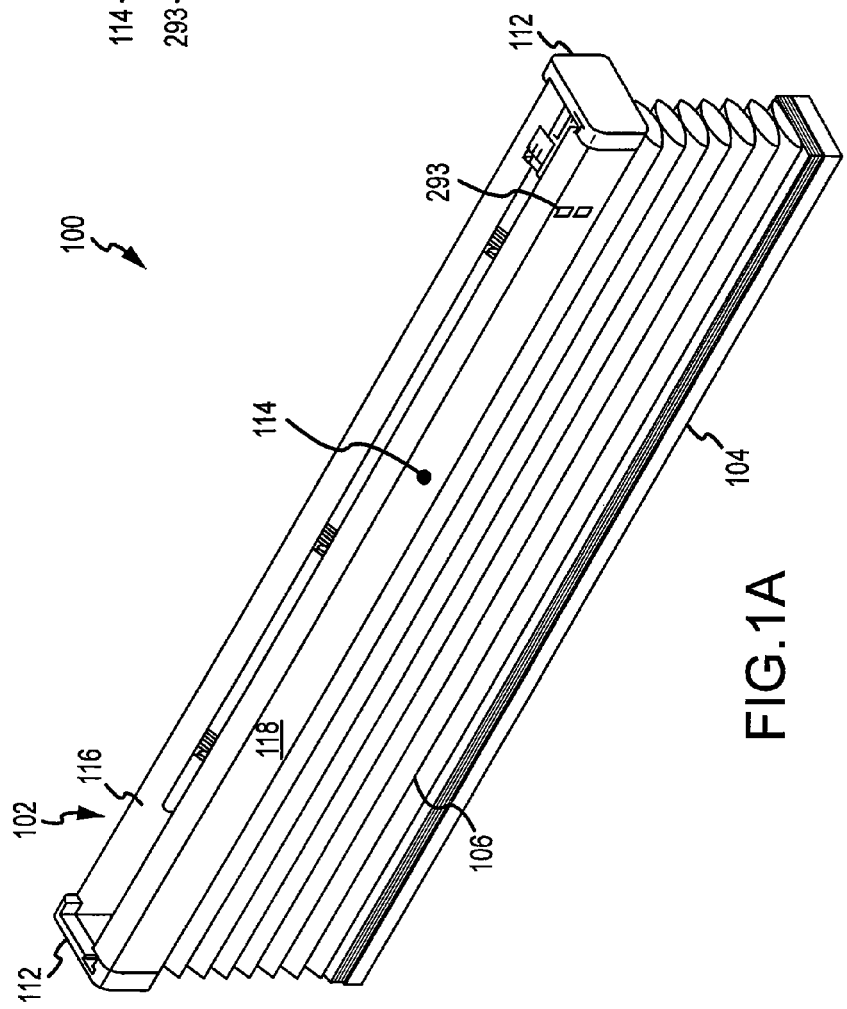

PROGRAMMABLE MOTOR FOR WINDOW COVERINGS

INVENTIVE FIELD

The various embodiments of the present invention relate to electrically powered coverings for architectural openings. More specifically, apparatuses, processes, systems and methods are disclosed for providing motorized operation for architectural window coverings.

BACKGROUND

Methods and systems for automatically controlling window coverings have become desirable over the past several decades. Such systems often utilize some type of motor to control the operation of the window coverings. This motor is often implemented within the top of the architectural window covering in a portion referred to as the "head rail". Because the motor may be implemented within the head rail, depending upon its size, it may cause the head rail to be undesirably large. It may be desirable to minimize the size of the head rail for a variety of reasons. For example, if the head rail is too large it may obstruct the view through the window.

The size of the motor often depends upon the mechanical torque and/or lifting requirements of the window covering, which in turn, may be dependent upon the size of the window that is being covered and the particular covering being used. In general, larger windows and/or heavier window coverings may require either a large motor that is capable of providing an adequate amount of torque or a smaller motor along with accompanying gearing to provide an adequate amount of torque. Both the larger motor and the smaller motor with accompanying gearing may undesirably consume a great deal of space within the head rail or may generate excessive noise. Thus methods and systems are needed for implementing and controlling motors in window coverings while minimizing their impact on the size of the head rail.

SUMMARY

An architectural window covering having a programmable electric motor is disclosed. The architectural window covering includes a head rail comprising at least one cavity, a shade coupled to the head rail, a bottom rail coupled to the shade, and at least two tandem stacked motors coupled to the shade via a drive rail such that the at least two motors fit within the at least one cavity of the head rail.

A method of operating an architectural window covering is also disclosed. The method may comprise the operations of monitoring two or more motors, whereby the motors are physically coupled together in tandem within a head rail of the architectural window covering and whereby the motors are electrically coupled together in a parallel fashion. The method further may comprise measuring a movement characteristic associated with at least one of the two or more motors and generating an error signal based on the movement characteristic associated with at least one of the two or more motors.

DESCRIPTION OF THE FIGURES

FIG. 1A is a perspective view of an exemplary window covering.

FIG. 1B is an end view of the exemplary architectural window covering shown in FIG. 1A.

The use of the same reference numerals in different drawings indicates similar or identical items.

DETAILED DESCRIPTION

Figure 2A:
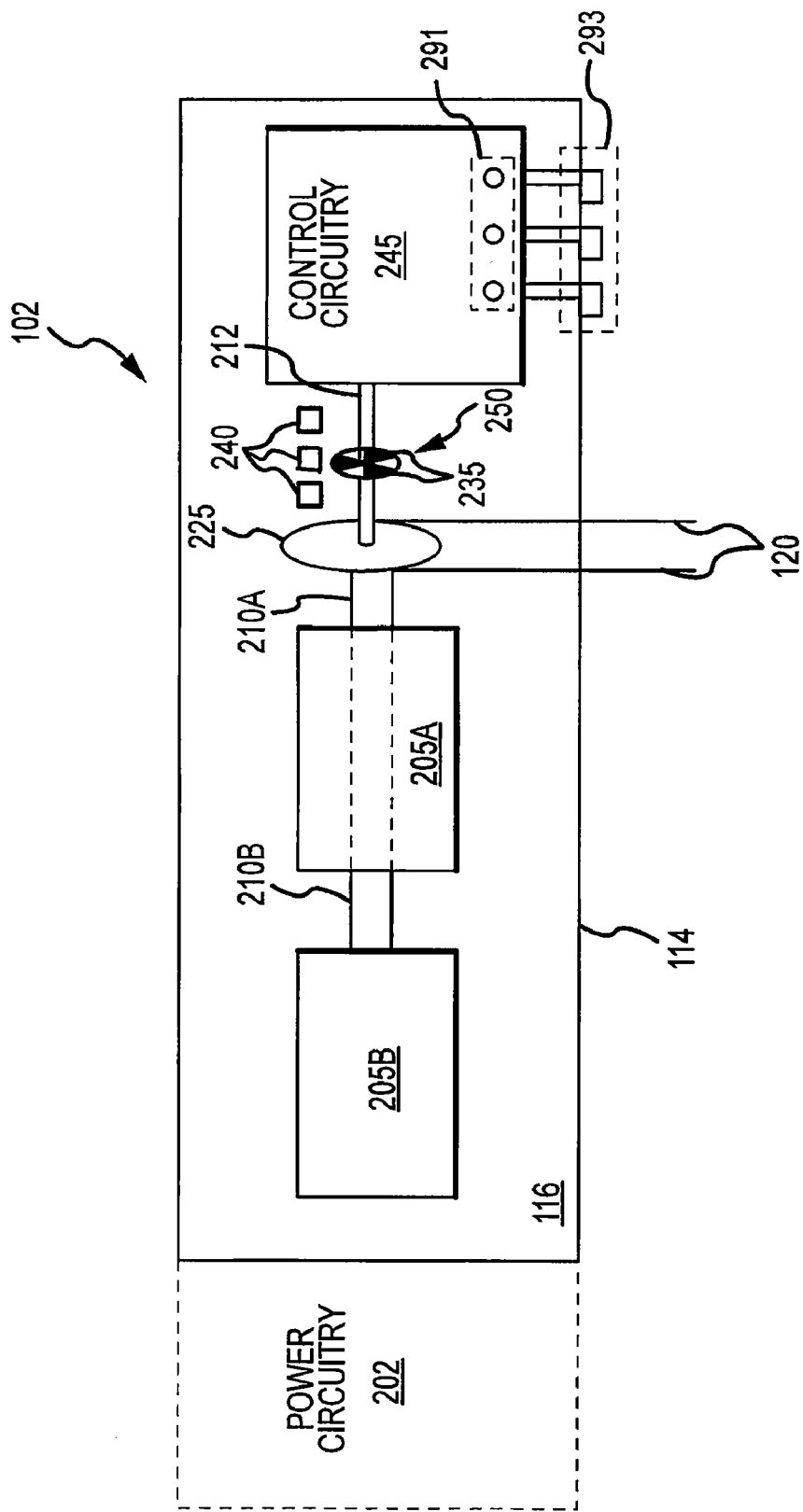
FIG. 2A is a top view of the exemplary architectural window covering shown in FIGS. 1A and 1B.

A programmable motor arrangement that fits within a head rail of an architectural window covering is disclosed. The programmable motor arrangement may include at least two motors that are tandem stacked within the head rail along with accompanying circuitry. By stacking the motors in a tandem fashion, the amount of radial space that they consume within the head rail may be minimized. Additionally, the motors may be electrically connected in parallel and controlled using pulse-width-modulated signals.

The programmable motor arrangement also may include one or more depressible switches that may be implemented in the head rail of the window covering. In some embodiments, these switches may be located proximate to LEDs that also are within the head rail and are visible to the user through light pipes. The light pipes may be coupled physically to the switches and optically to the LEDs. In this manner, the combination of the switches, LEDs, and light pipes may operate jointly to allow the user to enter programming information into the circuitry accompanying the motor arrangement. The LEDs may also be used to communicate failure of the embodiment and/or motor to the user, as well as other statistical, historical or operational information.

FIGS. 1A and 1B show an exemplary architectural window covering assembly 100 according to at least one embodiment. The assembly 100 includes a head rail 102, a bottom rail 104, and a shade 106. (The terms "shade" and "covering" are used generally interchangeably herein.) In some embodiments, the head rail 102 and bottom rail 104 may be formed from aluminum, plastic, or some other light weight materials. The exemplary shade 106 shown in FIG. 1 includes an expandable and contractible covering made from a light fabric and/or paper, although various covering implementations are possible. The exemplary shade 106 also is shown to be a cellular honeycomb shade, however, a pleated shade, horizontal slats, and/or other liftable coverings may also be used.

As seen in FIGS. 1A and 1B, the head rail 102 may include a bottom panel 108, a back panel 110, end caps 112 and a front panel 114. The front panel 114 may be hinged by pins (not shown), attached at its upper end corners, to the end caps 112. This may facilitate access to the cavity 116 within the head rail 102 behind the front panel's front surface 118. Alternatively, the front panel 114 may be hinged to the bottom member 108, or even be fully removable and snapped onto the rest of the head rail 102.

FIG. 1B shows one embodiment where a plurality of lift cords 120 may descend from within the head rail 102, pass through the cells of the honeycomb shade 106, to the bottom rail 104 where they are secured. As such, the weight of the bottom rail 104 and the shade 106 may be supported by the lift cords 120. It should be noted that while the lift cords 120 are discussed herein as tubular strings, this is merely an exemplary implementation. The lift cords 120 may be made of any type of material and take many physical forms, such as ribbon shaped pieces of fabric or the like. In some embodiments, the lift cords 120 may be eliminated altogether and the shade 106 may be rolled upon a shaft within the head rail 102.

FIG. 2A shows a top view of the cavity 116 of the head rail 102 according to one embodiment. As shown, the cavity 116 may include power circuitry 202 and two or more motors 205A-B that fit within the dimensions of the head rail 102. In some embodiments, the motors 205A-B may be tubular motors arranged in a tandem fashion within the head rail 102. As shown, the motor 205B may physically couple to the motor 205A via a coupler 210B. Similarly, the motor 205A may physically couple to a drive rail 212 via an output shaft 210A. In some embodiments, the drive rail 212 may operatively engage a rotatable mounted reel 225, and the lift cords 120 may be positioned on the reel 225 such that they are wound and unwound about the reel 225 during operation.

Figure 2B:
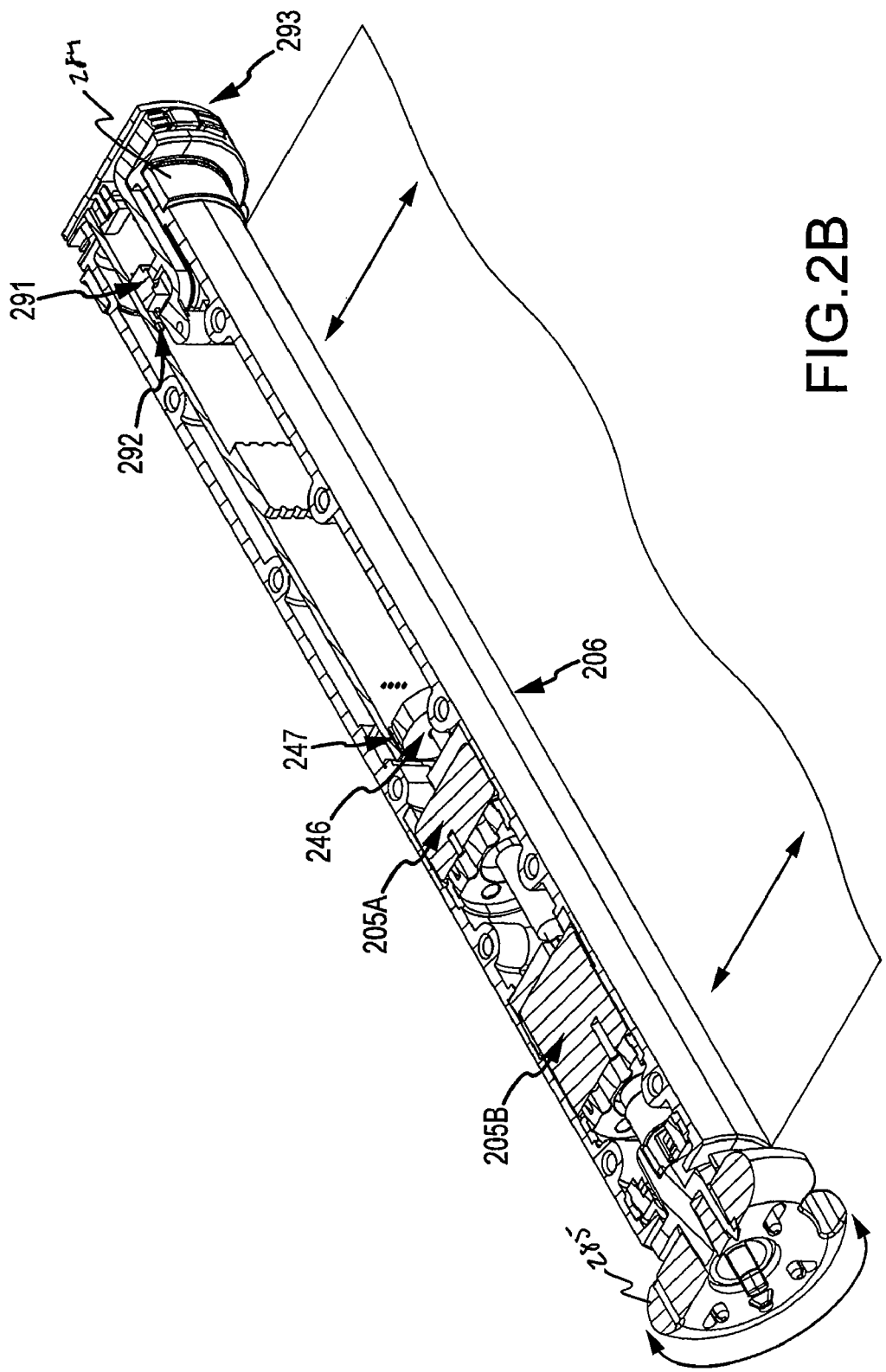
FIG. 2B is an alternative tubular motor enclosure.

In other embodiments, the motors 205A-B may be tubular motors located within a motor housing 206 as shown in FIG. 2B. The motor housing 206, in turn, may be seated within an idler ring 284. A shroud (not shown) may rest atop the idler ring 284 and be connected to a drive gear 285. As the motors 205A, 205B rotate, the motor housing 206 may remain stationary, as may the shroud. By contrast, the drive gear 285 may be rotated by the action of the motors. The drive gear is connected or affixed to the shade 106. Thus, as the drive gear rotates, the shade 106 is extended or retracted depending on the direction of rotation of the gear. It should be noted that FIGS. 2A and 2B depict alternative embodiments of a dual-motor drive system as described herein. Further, it should be noted that the layout, configuration, spacing and/or order of elements in such embodiments may vary.

During operation, the motors 205A-B may be electrically coupled together in a parallel fashion. In some embodiments, the motors 205A-B may be controlled using a pulse-width-modulated (PWM) signal. By varying the duty cycle of the PWM signal the average voltage delivered to the motors 205A-B may be controlled to match the operating conditions of the architectural window covering 100. For example, a low average voltage for the PWM signal (e.g., duty cycle 20%) may correspond to moving the architectural window covering 100 relatively slow while a high average voltage for the PWM signal (e.g., duty cycle 80%) may correspond to moving the window covering relatively fast.

By implementing two or more tandem stacked motors, the head rail 102 may be kept as compact as possible while providing additional torque to optimize the mechanical strength provided to operate the architectural window covering assembly 100. For example, if the architectural window covering assembly 100 is fashioned about an unusually long window, where the weight of the architectural window covering may be greater than normal, one or more additional tandem stacked motors may be added to the head rail 102 as necessary to handle the additional mechanical strength requirements.

In addition, the use of multiple tandem motors may allow certain embodiments to generate sufficient torque to raise or lower the shade 106 (or other covering for an architectural opening) while simultaneously reducing gearbox ratios. In a standard drive system for a shade, a single motor requires a relatively high rotational speed given the gearing of the motor. This, in turn, often leads to the motor producing an audible noise during operation. By contrast, certain embodiments may operate the motors 205A, 205B at a lower speed since the dual-motor arrangement may generate torque equivalent to a single-motor system but at a lower operational speed. Accordingly, the operational noise of the present embodiment may be reduced and, in some cases, relatively inaudible (depending on placement of the embodiment and distance to a listener).

As illustrated in FIG. 2A, a drive rail encoder 230 may be coupled to the drive rail 212. The encoder 230 may include multiple regions 235 angularly positioned about the drive rail 212. As the drive rail 212 moves in an angular direction, the regions 235 pass by one or more angular sensors 240 that may be read by a control circuit 245. (The control circuit is described in more detail below with regard to FIG. 3A). During operation, the encoder 230 may indicate angular movement of the drive rail 212, such as the angular position, velocity, and/or acceleration of the drive rail 212 to name but a few. In some embodiments, the microprocessor 305 may use the encoder 230 to profile the movement of the motors 205A-B. For example, the microprocessor 305 may monitor movement of the motors to track the position of the architectural window covering 100 in the window.

FIG. 2B illustrates an alternative encoder arrangement where a magnet 246 is coupled to the end of the motor 205A. As the motor 205A rotates, the magnet 246 may be read by a Hall Effect sensor 247 to encode the pattern of rotation or mark relative position. Position, in this instance, is marked relative to an index since the Hall Effect sensor counts the number of times a pole of the magnet 246 passes the sensor. Accordingly, since the Hall Effect sensor only counts these "ticks" without reference to an absolute start, the measurement is made relative to an index. Further, the magnet 246 typically is not a single magnet, but instead a number of magnets arrayed with opposing poles side-by-side. For example, a circular magnetic array 246 may be made of eight (or more, or fewer) wedge-shaped magnets positioned such that the polarity of each magnet alternates. It should be noted that the magnet 246 and Hall Effect sensor 247 cooperate to replace the optical wheel 230 and sensors 240 described in the embodiment shown in FIG. 2A.

Figure 2C:
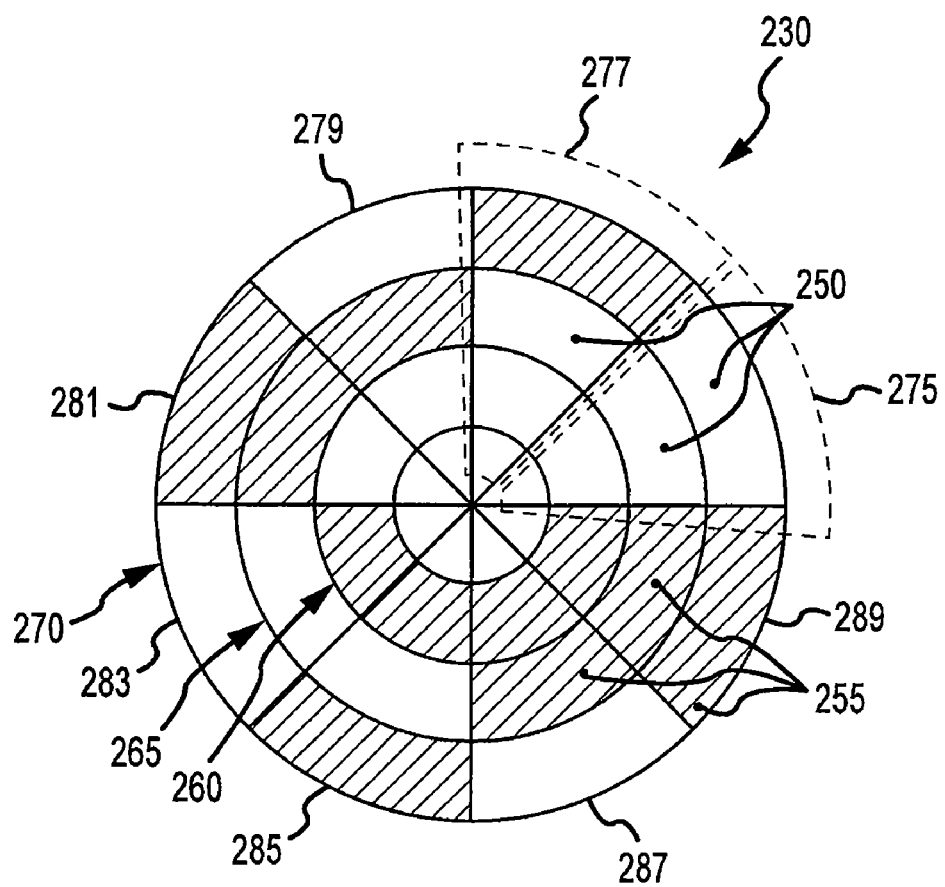
FIG. 2C is an exemplary drive rail encoder pattern.
Figure 2D:
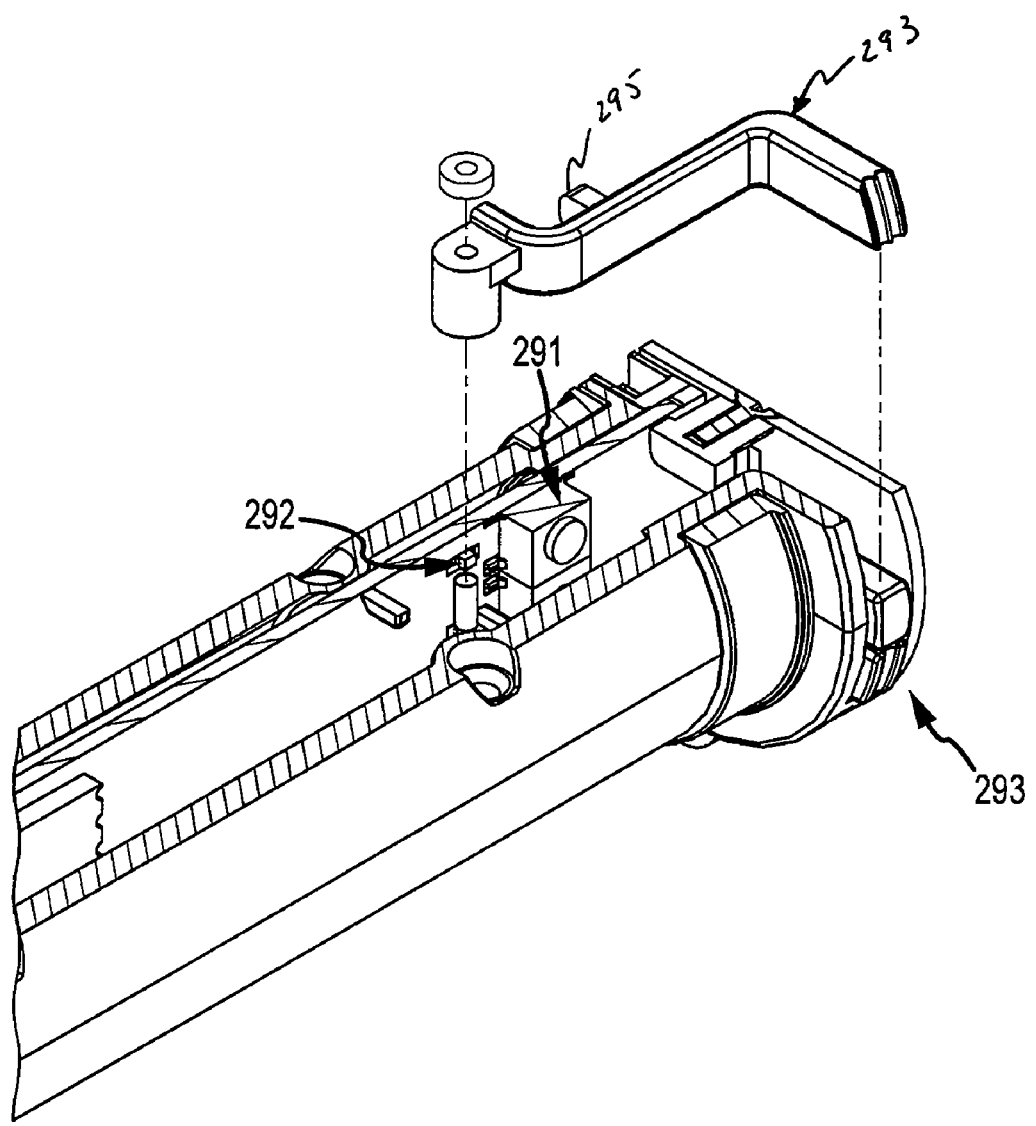
FIG. 2D is an enlarged exploded partial cross-section view of the tubular motor enclosure of FIG. 2B.

FIG. 2C illustrates an exemplary drive rail encoder 235 pattern arrangement including shaded 250 and unshaded 255 regions. In the embodiments where the encoder is the magnet 246, the shaded and unshaded regions 250 and 255 may correspond to regions of opposite magnetic polarity. Thus, the Hall Effect sensor 247 may profile the rotational movement of the magnet 246 by measuring changes in magnetic polarity. In other embodiments, the shaded regions 250 may be physical openings in the surface of the drive rail encoder 235 and the unshaded regions 255 may be closed portions of the same. In this manner, the one or more sensors 240 may be optical sensors that detect whether light emanates through the regions (as may be the case for the region 250) or light is blocked by the regions (as may be the case with the region 255). Regardless of the particular implementation, the shaded and unshaded regions 250, 255 may represent a three bit binary encoder with three concentric rings 260, 265, and 270. The first ring 260 may be designated as the least significant bit, the second ring 265 may be designated as the next most significant bit, and the third ring 270 may be designated as the most significant bit.

In the exemplary drive rail encoder 230, the regions 250, 255 collectively provide a standard binary count as the disc rotates where the shaded regions 255 produce a binary 1 value and the unshaded regions provide a binary 0 value. Groups of concentric regions may be designated as sectors. For example, the sector between 0 and 45 degrees is shown as sector 275 where all three regions within the sector 275 are unshaded and therefore the value of sector 275 is binary 000. The angular position, velocity, and acceleration of the drive rail 212 may be determined by monitoring the sequence of measurements from the drive rail encoder 230. For example, if the encoder readings go from 000 to 111 then the drive rail 212 is moving angularly in the counter-clock wise direction. The following table summarizes the binary encoding of the various sectors 275-289 of the exemplary drive rail encoder shown in FIG. 2C.

| Sector | Ring 260 | Ring 270 | Ring 275 | Representative Angle |
|---|---|---|---|---|
| 275 | 0 | 0 | 0 | 0° to 45° |
| 277 | 0 | 0 | 1 | 45° to 90° |
| 279 | 0 | 1 | 0 | 90° to 135° |
| 281 | 0 | 1 | 1 | 135° to 180° |
| 283 | 1 | 0 | 0 | 180° to 225° |
| 285 | 1 | 0 | 1 | 225° to 270° |
| 287 | 1 | 1 | 0 | 270° to 315° |
| 289 | 1 | 1 | 1 | 315° to 360° |

Alternative arrangements to the exemplary drive rail encoder 230 are possible, for example, in some embodiments, Gray coding may be implemented instead of binary encoding. In other embodiments, the encoder may be integrated with other components within the assembly 100, such as the reel 225. In still other embodiments, any number of drive rail encoders 230 may be implemented, for example each of the motors 205A-B may have separate encoders.

Referring again to the exemplary implementations shown in FIGS. 2A and 2B, the control circuitry 245 may convert angular movement reported by the one or more sensors 240 into electrical impulses in analog or digital form for further processing. One or more switches 291 may be coupled to the control circuitry 245. The switches 291 may be capable of receiving user input, for example, by acting as a depressible switch that is electrically coupled to the control circuitry 245. The control circuit 245 also may couple to one or more LEDs 292 that emanate light. In some embodiments, the LEDs 292 may communicate the operational status of the window covering 100 to the user. In other embodiments, the LEDs 292 may communicate user programming settings effectuated through the one or more switches 291. (The LEDs are not shown on FIG. 2A, but are shown on FIG. 2B.)

As shown in FIG. 2A, the one or more switches 291 and the one or more LEDs 292 may be recessed in the head rail 102 and may couple through the cavity 116 via the one or more light pipes 293. In this manner, the one or more light pipes 293 may be made of fiber optic material that is capable of being formed into pathways so that light from the one or more switches 291 may be routed from within the cavity 116 to the user. Thus, the one or more switches 291 and the one or more LEDs 292 in combination with the one or more light pipes 293 may communicate various operational and/or programming options between the user and the control circuitry 245. For example, the one or more light pipes 293 may couple light from the one or more LEDs 292 to the user viewing the front panel 114. Additionally, the one or more light pipes 293 may be physically pressed by the user, and the one or more light pipes 293 in turn, may couple this to the to the one or more switches 291. Thus, the one or more light pipes 293 may provide mechanical coupling of the one or more switches 291 through the cavity 116 to the user. It should be noted that one light pipe is shown in an exploded or disassembled position while the other two are shown in an operating position.

One exemplary implementation of the switches 291, the LEDs 292, and the light pipes 293, as shown in FIG. 2B, will now be discussed. The light pipe 293 may be a clear plastic part with a hole 294 whereby the light pipe 293 may pivot about this hole 294 when the light pipe 294 is fixed through the hole 294. Further down the light pipe 293 a foot 295 may extend off and rests on the switch 291. The light pipe 293 may protrude through the motor housing 206 allowing the user to depress this protruding end in actuating the switch 291. By depressing the light pipe 293, it may rotate about the pivot point and cause the foot 295 to push on the switch 291.

In some embodiments, the user may program predetermined thresholds using the one more light pipes 293. These thresholds may include how far up or down the architectural window covering 100 may be within the window. Also, the one or more LEDs 292 may be used to echo the programming selections and/or stored threshold values back to the user during programming. In some embodiments, these thresholds may be changed dynamically by the user operating the architectural window covering 100.

Figure 3A:
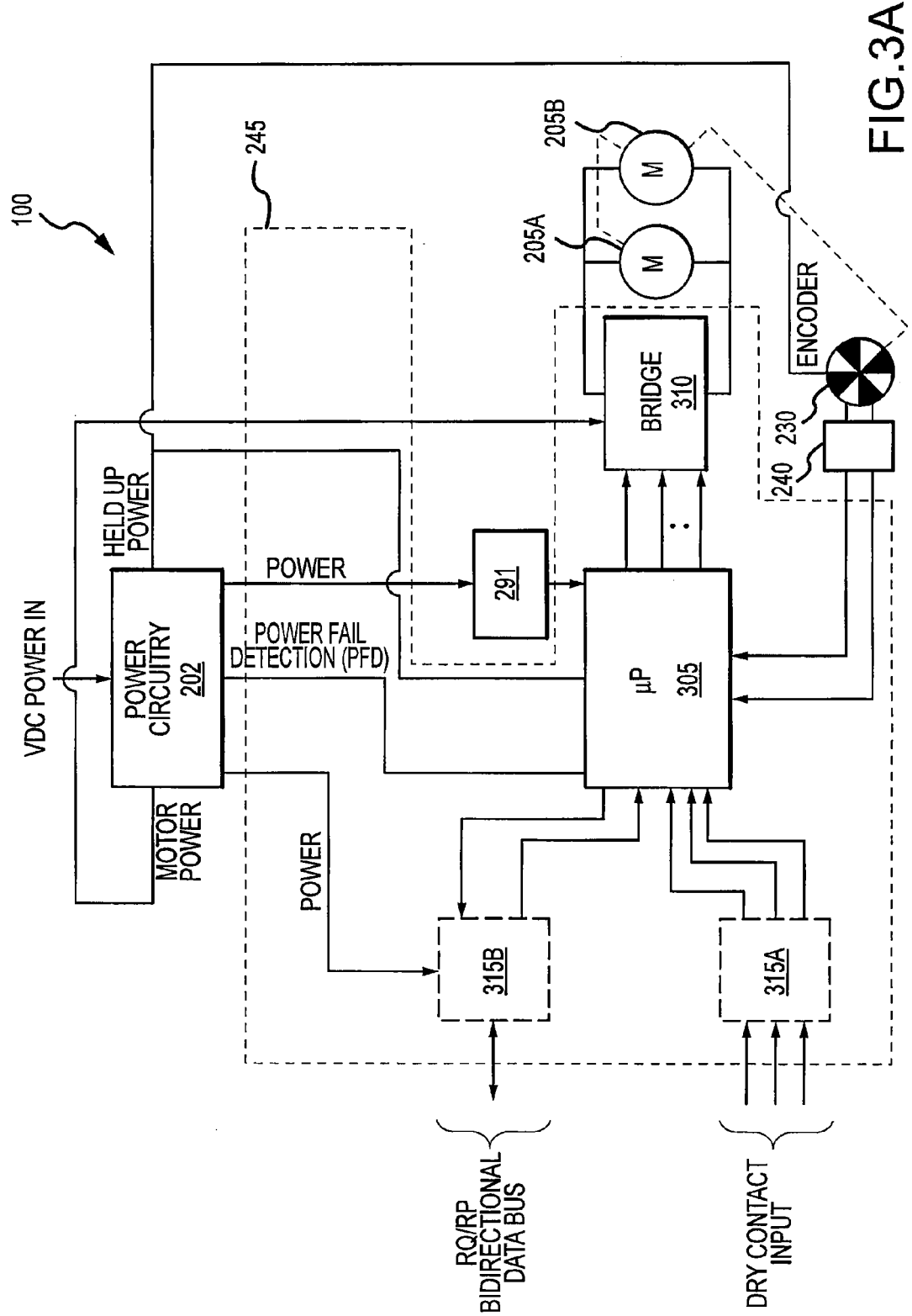
FIG. 3A is an exemplary block diagram of a widow covering.

FIG. 3A represents a block diagram of the widow covering 100 illustrating an exemplary configuration for the control circuitry 245. As shown, the control circuit 245 may include a microprocessor 305 coupled to a bridge circuit 310. In some embodiments, the bridge 310 may include one or more field-effect-transistors (FETs) that provide power to the motors 205A-B. In other embodiments, the bridge 310 includes insulated-gate-bipolar-transistors (IGBTs) that combine the advantages of a FET with the advantages of a bipolar transistor when providing power to the motors 205A-B. During operation, the microprocessor may monitor angular measurements of the motors 205A-B from the combination of the sensor 240 and the encoder 230.

Angular measurement may also be obtained from the magnet 246 and Hall Effect sensor 247, insofar as the sensor 247 may detect every time a certain magnetic polarity is adjacent the sensor. Further, the sensor 247 may measure the period of each such transition. Based on these angular measurements and the periods of transition, the microprocessor 305 may determine the distance traveled and velocity of the shade 106. Additionally, based upon measurements from the combination of the sensor 240, the encoder 230, and the up and down thresholds of the architectural window covering 100 set by the user, the microprocessor 305 may determine the position of the architectural window covering 100 with respect to its upper and lower extension limits. The microprocessor 305 may generate one or more error signals 325 based upon the difference between the angular measurements of the motors 205A-B or the periods of transitions sensed by the sensor and the desired values programmed in the microprocessor 305 (e.g., exert positional control). In this manner, the combination of the microprocessor 305, the motors 205A-B, and the encoder 230/magnet 246 may form an adaptive feedback and control loop to control overall operation of the motors 205A-B using the output of the sensor 247 or sensor 240, depending on the embodiment in question.

Figure 3B:
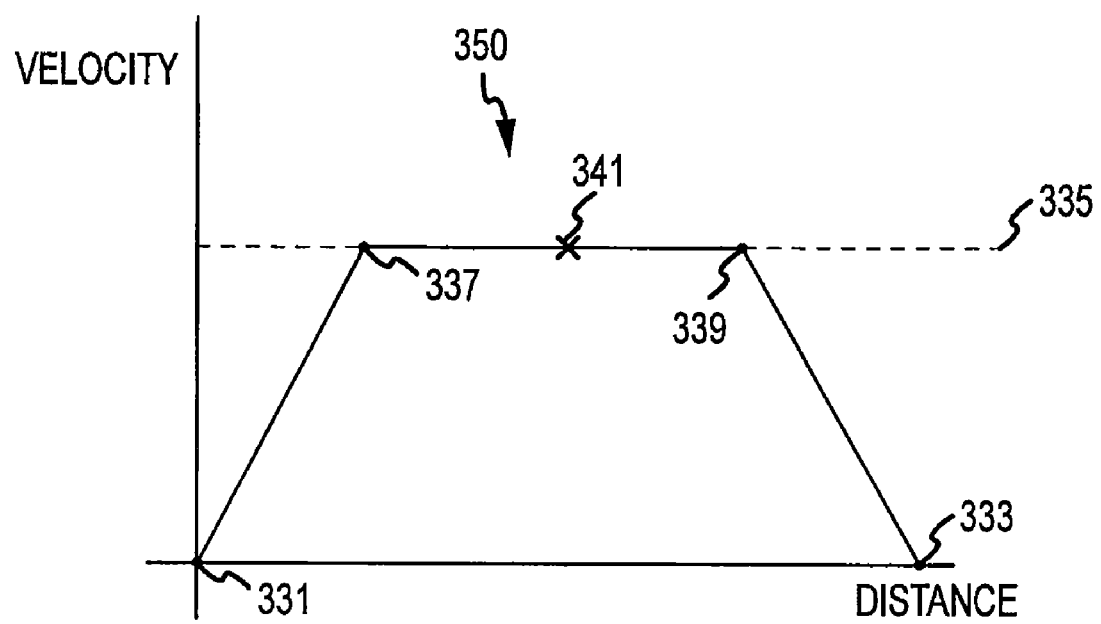
FIG. 3B depicts exemplary signals associated with angular measurements of a drive rail within a window covering.

In particular, FIG. 3B displays an exemplary operating curve 350 for certain embodiments when raising or lowering a shade 106. The operating curve 350 is shown on a graph having velocity as the Y-axis and distance as the X-axis. Here, both velocity and distance are expressed with respect to the shade 106 (e.g., the velocity and distance traveled of the shade). Initially, as the motors 205A, 205B extend or raise the shade in the manner described above, the shade's velocity varies with the distance traveled (e.g., the shade accelerates). At a first equilibrium point 337, the velocity of the shade is held constant as the shade continues to travel. At a second equilibrium point 339, the embodiment senses via the sensor 247/240 that the shade is nearing an endpoint of its travel. Accordingly, the motors decelerate the shade such that its velocity returns from a constant value to zero across a certain distance. Thus, at the end point 33, the shade's travel is complete and its velocity is zero. The first and second equilibrium points 337, 339 thus define the beginning and end of the constant velocity portion of the operating curve 350, which is the section where the shade's velocity is in equilibrium.

In some embodiments, the window covering's velocity between the starting point 331 and the ending point 333 may be non-uniform. For example, in the exemplary operating curve 350, the architectural window covering 100 may slightly accelerate or slightly decelerate during the constant velocity segment of the curve 350 to maintain an overall constant velocity and, for example, to correct for error or jitter in the travel of the shade.

In some embodiments, the acceleration and deceleration portions of the operating curve 350 may be accomplished in whole, or in part, by one of the motors 205A-B.

Between the equilibrium points 337, 339, the motors 205A-B may operate at a predetermined velocity 335. The predetermined velocity 335 may be preprogrammed during manufacture of the architectural window covering 100, or alternatively, may be programmed by the user after installation.

It should be noted that various operating curves may be employed. For example, the operating curve may be exponentially increasing instead of linearly increasing between points 331 and 337. Furthermore, in some embodiments, the architectural window covering 100 may include a tensioning sensor to determine when the architectural window covering 100 reaches the top or the bottom of the window opening and the operating curve may be modified accordingly. For example, the operating curve may be saw tooth shaped so that the architectural window covering may descend at a constant velocity for a short distance and then stop to determine the tension in the cords 120 and adjust operation accordingly.

During non-operation, the architectural window covering 100 may be in a powered off state, for example, because the desired window position has been achieved and no further adjustments in position are desired by the user. When the user desires to move the architectural window covering 100 after being powered down, the control circuit 245 may power itself up and determine the position of the architectural window covering prior to power down. Then, upon power up, the microprocessor 305 may use this last known position of the architectural window covering to move the architectural window covering 100 to the user's new desired position according to the operating curve 350 and/or last known position of the covering 100. For example, the user may set the architectural window covering 100 to be midway between the first and second intermediate points, at a third intermediate point 341, and then leave the architectural window covering 100 in that position for an extended period of time. After a predetermined period of time (which may be programmed by the user into the microprocessor 305) the control circuit 245 may enter a low power mode or power off completely to conserve power, and while doing so, may save the position of the architectural window covering 100 prior to power down. In this example, the last position prior to power off is the intermediate point 341. When the user later wants to readjust the position of the architectural window covering 100, the control circuit 245 may power back up, determine that the last position of the architectural window covering 100 was the third intermediate point 341, and then move the architectural window covering according to the operating curve starting at the third intermediate point 341.

Referring again to FIG. 3A, the control circuit also may include one or more optional (as indicated by the dashed boxes) interface and protection circuits 315A-B. The protection circuits 315A-B may filter the microprocessor 305 and the other circuitry within the control circuit 245 from external electromagnetic interference (EMI) and electrostatic discharge (ESI). In addition, the protection circuits 315A-B also may filter out internal EMI/ESI from signals coming from the control circuit 245 to ensure that the control circuit 245 complies with FCC requirements.

The protection and interface circuit 315A may include one or more manual user inputs or switches to control the position of the architectural window covering 100 in the window. In some embodiments, this may include single-pole-single-throw type switches that are located at a geographically different location than the architectural window covering 100 or the control circuit 245. In other embodiments, this may include a single-pole-double-throw type switch that is located at a geographically different location than the architectural window covering 100 or the control circuit 245. The user may program the control circuit 245 using the protection and interface circuit 315A by actuating the switch to the up, down, and/or neutral positions.

The protection and interface circuit 315B may include a bidirectional data interface such as an RQ™ type interface standard from Electronic Solutions, Inc. of Lafayette, Colo. The RQ™ type interface is a six conductor bidirectional full-duplex data interface. Alternative embodiments may use the unidirectional RP type data communication protocol that provides simplex communication. In still other embodiments, the protection and interface circuit 315B may include a bidirectional data protocol or communication interface, such as the Z-wave™ interface from Zensys. Implementing Z-Wave™ allows low power consumption, 2-way RF, mesh networking technology and battery-to-battery support. During operation, Z-Wave™ mesh networking technology routes 2-way command signals from one Z-Wave™ device to another around obstacles or radio dead spots that might occur. Additional interface types may include CAN, LON, and Zigbee to name but a few.

Regardless of the type of bidirectional data interface used, the interface may allow the microprocessor 305 to be queried as to the present status of the architectural window covering 100. For example, in some embodiments the architectural window covering 100 is configured with a graphic on it so as to display a message or logo. The message or logo may be displayed as the architectural window covering 100 rotates its shades back and forth, which may be a function of the position of the drive rail 212. Thus, the interface may be used to remotely control the message or logo displayed on the shades of the architectural window covering 100 by allowing the user to query the drive rail position.

In addition, a plurality of window coverings may be linked together via an interface and user commands may be echoed between window coverings within the plurality. For example, all of the window coverings on the East side of a building may be linked together via the interface and a user standing at one end of the building and desiring to operate all the window coverings in unison may provide the desired command to the architectural window covering the user happens to be standing by and have the desired command echoed to all window coverings on that same interface.

As was mentioned above, the architectural window covering 100 may include the power circuitry 202. As shown in FIG. 3A, the power circuitry 202 may provide power to the bridge 310, the protection circuits 315A-B, the microcontroller 305, the one or more switches 291, and or the one or more angular sensors 240. The power circuitry 202 may receive a 12-24 volt DC input power and provide various output voltage levels. For example, the interface and protection circuit 315B may operate at 10 volts while the microcontroller 305 may operate at 5 volts. The power circuitry 202 is capable of supplying power at both these levels as well as many others. In some embodiments, the protection circuit 315A may receive its power via the microcontroller 305. In alternative embodiments, the input power may range from 12 to 40 volts DC.

The power circuitry 202 may provide a power fail detection line to the microprocessor 305. In the event that the power circuitry 202 detects that the main power supplied to the power circuitry 202 has been turned off, then it may warn the microcontroller 305 this has occurred via the power fail detection line shown. The power circuitry 202 also may include the ability to implement an efficient power down scheme. In order to give the power circuitry 202 sufficient hold-up time for the microcontroller to execute a power down sequence, the power circuitry 202 may include a capacitor that stores enough charge to power the microcontroller while it executes the power down scheme. In some embodiments, this scheme includes determining that power is going away, for example, by the microcontroller determining that the power main has been shut off. As a result, the microprocessor 305 may stop the two or more motors 205A-B, monitor the deceleration of the encoder 230, and save the state of the encoder for use when the architectural window covering is powered back on.

The above discussion is meant to be illustrative of the principles and various embodiments of the present invention. Numerous variations and modifications will become apparent once the above disclosure is fully appreciated. For example, the programmable motor arrangement may find application in a variety of settings outside the context of architectural window coverings such as in garage door openers or with retractable projection screens. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

The invention claimed is:

1. An architectural window covering, comprising:
a head rail comprising a front panel having one or more light pipes, the front panel defining in part at least one cavity;
a shade coupled to the head rail;
a bottom rail coupled to the shade;
one or more light emitting diodes (LEDs) situated within the at least one cavity; and
at least two tandem stacked motors coupled to the shade, wherein:
the at least two motors cooperate to rotate a drive shaft and the at least two motors fit within the at least one cavity of the head rail; and
at least one of the one or more light pipes is optically coupled to each of the one or more LEDs.

2. The architectural window covering of claim 1, wherein the at least two tandem stacked motors are electrically coupled in parallel.

3. The architectural window covering of claim 1, further comprising a circuit operating the window covering, wherein one or more switches recessed in the head rail are capable of programming the circuit.

4. The architectural window covering of claim 1, wherein the at least two tandem stacked motors operate according to a predefined characteristic.

5. The architectural window covering of claim 4, wherein the predefined characteristic is defined in part by a pulse width modulated signal.

6. The architectural window covering of claim 4, further comprising a microprocessor that stores positional information of the architectural window covering prior to powering the architectural window covering off.

7. The architectural window covering of claim 6, where the architectural window covering operates along the predetermined characteristic at a position stored in the microprocessor prior to powering the architectural window covering off.

8. The architectural window covering of claim 1, further comprising an encoder coupled to the shaft, wherein the movement of the architectural window covering is profiled using the encoder.

9. The architectural window covering of claim 8, wherein each of the at least two tandem stacked motors includes an encoder.

10. An architectural window covering comprising:
a head rail comprising at least one cavity, the at least one cavity is defined in part by a front panel having one more light pipes;
a shade coupled to the head rail;
a bottom rail coupled to the shade;
at least two tandem stacked motors coupled to the shade;
one or more light emitting diodes (LEDs) situated within the at least one cavity;
a circuit operating the window covering; wherein
the at least two motors fit within the at least one cavity of the head rail;
at least one of the one or more light pipes are optically coupled to each of the one or more LEDs; and
one or more switches recessed in the head rail are capable of programming the circuit and the combination of the light pipes and the one or more switches are depressible and capable of programming the circuit.

11. The architectural window covering of claim 10, wherein a user programs the travel limits of the window covering using the one or more LEDs and/or the one or more switches.

12. A method of operating an architectural window covering, comprising the operations of:
monitoring two or more motors, whereby the motors are physically coupled together in tandem within a head rail of the architectural window covering and whereby the motors are electrically coupled together in a parallel fashion;
measuring a movement characteristic associated with at least one of the two or more motors;
generating an error signal based on the movement characteristic associated with at least one of the two or more motors, wherein the error signal comprises a pulse-width-modulated signal representing the difference between a desired movement characteristic and the measured movement characteristic; and
programming the movement characteristic using one or more switches within the head rail; wherein
the architectural window covering comprises one or more light pipes coupled to the one or more switches through the head rail and the one or more light pipes couple to the one or more switches physically and optically.

13. The method of claim 12, wherein the operation of programming the movement characteristic includes the speed at which the architectural window covering moves within a window.

14. The method of claim 12, wherein the operation of monitoring includes utilizing a magnetic encoder.

15. The method of claim 14, further comprising the operation of profiling positional information about the two or more motors based on measurements from the magnetic encoder.

16. The method of claim 12, further comprising the operation of storing positional information for the architectural window covering prior to powering down the architectural window covering.

17. The method of claim 12, wherein the error signal comprises a pulse-width-modulated signal representing the difference between a desired movement characteristic and the measured movement characteristic.

18. The method of claim 12, further comprising the operation of programming the movement characteristic using one or more switches within the head rail.

19. An architectural window covering system, comprising:
   a plurality of architectural window coverings electrically coupled to each other, each architectural window covering comprising:
      a head rail comprising a front panel defining in part at least one cavity;
      a shade coupled to the head rail;
      a bottom rail coupled to the shade;
      one or more light pipes operably connected to the front panel;
      one or more light emitting diodes (LEDs) situated within the at least one cavity, and
      at least two tandem stacked motors coupled to the shade, wherein:
      the at least two motors are fully located within the at least one cavity of the head rail and the at least two motors cooperate to rotate a drive shaft; and
      a first architectural window covering within the plurality communicates at least one programming signal to a second architectural window covering within the plurality; and
      at least one of the one or more light pipes is optically coupled to each of the one or more LEDs.

20. The architectural window covering system of claim 19, wherein the first architectural window covering comprises one or more switches within the head rail.

21. The architectural window covering system of claim 19, wherein the at least two tandem stacked motors operate according to a predefined characteristic.

22. The architectural window covering system of claim 21, wherein the predefined characteristic is defined in part by a pulse width modulated signal.

23. The architectural window covering system of claim 19, wherein the at least two tandem stacked motors are electrically coupled in parallel.

24. An architectural window covering system comprising:
   a plurality of architectural window coverings electrically coupled to each other, each architectural window covering comprising:
      a head rail comprising at least one cavity;
      a shade coupled to the head rail;
      a bottom rail coupled to the shade; and
      at least two tandem stacked motors coupled to the shade;
      a first architectural window covering within the plurality comprises one or more switches within the head rail; and
      one or more light pipes coupled to the one or more switches through the head rail; wherein
   the at least two motors are fully located within the at least one cavity of the head rail;
   the first architectural window covering communicates at least one programming signal to a second architectural window covering within the plurality; and
   the one or more light pipes are also coupled to one or more LEDs within the head rail.

25. The architectural window covering system of claim 24, wherein the at least one programming signal from the first architectural window covering results from depressing at least one of the one or more light pipes.

* * * * *